(12) United States Patent
Arce et al.

(10) Patent No.: US 11,473,555 B2
(45) Date of Patent: Oct. 18, 2022

(54) WIND TURBINE BLADE COMPRISING A TRAILING EDGE NOISE REDUCING DEVICE

(71) Applicant: LM WIND POWER US TECHNOLOGY APS, Kolding (DK)

(72) Inventors: Carlos Arce, Diemen (NL); Bjarke Nielsen, Kolding (DK); Peter Baek, Jelling (DK)

(73) Assignee: LM WIND POWER US TECHNOLOGY APS, Kolding (DK)

( * ) Notice: Subject to any disclaimer, the term of this patent is extended or adjusted under 35 U.S.C. 154(b) by 284 days.

(21) Appl. No.: 16/476,951

(22) PCT Filed: Jan. 12, 2018

(86) PCT No.: PCT/EP2018/050755
§ 371 (c)(1),
(2) Date: Jul. 10, 2019

(87) PCT Pub. No.: WO2018/130651
PCT Pub. Date: Jul. 19, 2018

(65) Prior Publication Data
US 2019/0353141 A1 Nov. 21, 2019

(30) Foreign Application Priority Data

Jan. 12, 2017 (EP) ..................... 17151172

(51) Int. Cl.
*F03D 1/06* (2006.01)
*F03D 7/02* (2006.01)

(52) U.S. Cl.
CPC ......... *F03D 1/0641* (2013.01); *F03D 7/0296* (2013.01); *F05B 2250/182* (2013.01); *F05B 2260/96* (2013.01)

(58) Field of Classification Search
CPC .... F03D 1/0641; F03D 1/0633; F03D 7/0296; F05B 2250/182; F05B 2260/96; Y02E 10/72; Y02P 70/50
See application file for complete search history.

(56) References Cited

U.S. PATENT DOCUMENTS 2,071,012 A * 2/1937 Adams .................... B64C 11/00
244/35 R
5,088,665 A * 2/1992 Vijgen .................. F03D 1/0675
244/215

(Continued)

FOREIGN PATENT DOCUMENTS

CN   106246478 A * 12/2016
CN   106246478 A   12/2016

(Continued)

OTHER PUBLICATIONS

Sun CN 106246478 English Machine Translation, Translated by ProQuest Aug. 18, 2021 (Year: 2016).*

(Continued)

*Primary Examiner* — David E Sosnowski
*Assistant Examiner* — Wayne A Lambert
(74) *Attorney, Agent, or Firm* — Nath, Goldberg & Meyer; Jerald L. Meyer; Tanya E. Harkins

(57) ABSTRACT

This invention relates to a noise reducing device, a wind turbine blade comprises such a noise reducing device, a method of retrofitted a noise reducing device, and a method of manufacturing such a noise reducing device. The noise reducing device comprises first noise reducing elements projecting from a base part having a third surface towards a second end. Second noise reducing elements are attached to the third surface and projects along the first noise reducing elements towards the second end. The first noise reducing elements are preferably serrations while the second noise (Continued)

reducing elements are bristles. The bristles projects at least into the gaps formed between adjacent serrations.

16 Claims, 7 Drawing Sheets

(56) References Cited

U.S. PATENT DOCUMENTS

| | | | | |
|---|---|---|---|---|
| 5,533,865 | A * | 7/1996 | Dassen | F03D 1/0608 244/200.1 |
| 6,789,769 | B2 * | 9/2004 | Mau | B64C 9/24 244/214 |
| 7,976,283 | B2 * | 7/2011 | Huck | F03D 1/065 416/240 |
| 8,083,488 | B2 * | 12/2011 | Fritz | F03D 1/0675 416/235 |
| 8,267,657 | B2 * | 9/2012 | Huck | F03D 1/0675 416/62 |
| 8,430,638 | B2 * | 4/2013 | Drobietz | F03D 1/0675 416/132 B |
| 8,523,515 | B2 * | 9/2013 | Drobietz | F03D 1/0675 416/228 |
| 9,638,164 | B2 * | 5/2017 | Vedula | F03D 1/0658 |
| 9,719,488 | B2 * | 8/2017 | Oerlemans | F03D 1/0675 |
| 2007/0077150 | A1 * | 4/2007 | Llorente Gonzalez | F03D 1/0608 416/223 R |
| 2008/0166241 | A1 * | 7/2008 | Herr | F03D 1/065 416/241 R |
| 2008/0187442 | A1 | 8/2008 | Standish et al. | |
| 2011/0142665 | A1 | 6/2011 | Huck | |
| 2011/0223030 | A1 | 9/2011 | Huck et al. | |
| 2011/0268558 | A1 * | 11/2011 | Driver | F03D 80/00 415/119 |
| 2014/0072441 | A1 * | 3/2014 | Asheim | F03D 1/0683 416/241 R |
| 2014/0377077 | A1 * | 12/2014 | Gruber | F01D 5/141 416/228 |
| 2017/0045031 | A1 * | 2/2017 | Asheim | F03D 1/0633 |
| 2020/0003177 | A1 * | 1/2020 | Oerlemans | F03D 1/0633 |
| 2020/0003178 | A1 * | 1/2020 | Oerlemans | F03D 1/0683 |

FOREIGN PATENT DOCUMENTS

| | | | | |
|---|---|---|---|---|
| CN | 110645141 | A * | 1/2020 | |
| CN | 112128050 | A * | 12/2020 | F03D 1/0675 |
| EP | 2708736 | A2 | 3/2014 | |
| EP | 3096003 | A1 | 11/2016 | |
| JP | 2015042864 | A * | 3/2015 | |

OTHER PUBLICATIONS

Communication Pursuant to Article 94(3) EPC dated Jun. 27,2022 corresponding to application No. 17151172.8-1002.

* cited by examiner

WIND TURBINE BLADE COMPRISING A TRAILING EDGE NOISE REDUCING DEVICE

This is a National Phase Application filed under 35 U.S.C. 371 as a national stage of PCT/EP2018/050755, filed Jan. 12, 2018, an application claiming the benefit of European Application No. 17151172.8, filed Jan. 12, 2017, the content of each of which is hereby incorporated by reference in its entirety.

TECHNICAL FIELD

The present invention relates to a noise reducing device for a wind turbine blade, having a first end, a second end, a first side surface, and a second side surface, wherein the noise reducing device comprises a base part extending from the first end to a proximal end, at least one array of first noise reducing elements extending from the proximal end to the second end, and at least one array of second noise reducing elements arranged relative to the first noise reducing elements.

The present invention further relates to a wind turbine blade with at least one noise reducing device as mentioned above. The present invention also relates to a method of retrofitting a noise reducing device, and a method of manufacturing a noise reducing device.

BACKGROUND

It is well-known that large wind turbine blades for modern wind turbines suffer from trailing edge noise generated by the airflow passing over the aerodynamic profile of the wind turbine blade. The airflow transforms from a substantially laminar airflow into a turbulent airflow over the blade surface and further separates from the boundary layers at a separation point. This generates vortices behind the trailing edge which generate a wake effect and associated hissing sounds at about one kilohertz (kHz).

It is known to integrate a noise reducing profile into the trailing edge section of the wind turbine blade. However, this increases the complexity of the lay-up process and adds additional steps to the manufacturing process. Another way of solving this problem is to attach one or more noise reducing devices at or near the trailing edge of the wind turbine blade. These noise reducing devices often comprise either a plurality of serrations or a plurality of brushes projecting from one or more base plates. Various shapes seen in the chordwise direction as well as various dimensions of these serrations has been proposed throughout the literature.

WO 2013/045601 A1 teaches different embodiments of two arrays of noise reducing elements arranged on a side surface of the wind turbine blade, wherein the first array is actively or passively moved relative to the second array during operation. In one embodiment, the first array comprises a plurality of serrations while the second array comprises a plurality of bristles. In this embodiment, the first array is connected to a movable mechanism capable of moving the first array in the chordwise direction between a retracted position and an extended position. In order to allow movement of the first array, the two arrays are connected to individual base plates which can be moved relative to each other.

This exemplary embodiment requires additional installation of linear actuators connected to an electronic control system, or of a spring loaded mechanism on the side surface of the wind turbine blade. Secondly, the two base plates must be separated to allow movement of the first array. This solution increases the complexity and costs of the trailing edge noise reducing device as well as the risk of one of the moveable components failing due to the external impacts or loads during rotation of the rotor.

EP 3096003 A1 discloses a wind turbine blade with an array of serrations projecting beyond the trailing edge of the wind turbine blade. Bristles are arranged along the peripheral edges of two adjacent serrations and extend in a chordwise direction into the gap formed by the adjacent serrations.

US 2008/0187442 A1 discloses a trailing edge part configured to be attached to a wind turbine blade, wherein the trailing edge part comprises a number of individual serrations between which a group of bristles is arranged. The serrations and bristles both project from a truncated edge surface of the trailing edge part.

US 2011/0223030 A1 discloses another solution where the array of bristles is arranged along the peripheral edge of the serrations. The serrations project from a base plate attached to the side surface of the wind turbine blade. Each bristle or cluster of bristles is placed in an angle between 5 degrees and 90 degrees relative to the trailing edge of the wind turbine blade or to the peripheral edge of the respective serration. The bristles and serrations may be formed as an integral piece by injection moulding. The bristles may instead have a thickened end which is placed in a groove formed in the peripheral edge surface of the serrations.

The above serrations form a narrow peripheral edge surface which requires a very precise alignment of the bristles during the manufacturing process to achieve a strong attachment. If a groove is formed in the peripheral edge surface, the structural strength of the area around the groove is further weakened. This solution is not suitable for modifying existing noise reducing devices due to the placement of the brushes.

Another alternative solution proposes to form a plurality of slits along the peripheral edge surface of the serrations. However, this requires either a stiff material or an increased serration thickness in order to prevent the material between adjacent slits from breaking off during operation. Yet another alternative solution proposes to form a plurality of recess along the trailing edge of the wind turbine blade, wherein brushes may extend from one or more side surfaces in each recess. However, this requires either a very complex lay-up process during manufacturing or the use of trailing edge reinforcements shaped to add structural strength to the laminate around each recess.

OBJECT OF THE INVENTION

An object of the invention is to provide a noise reducing device and a wind turbine blade that solves the abovementioned problems.

Another object of the invention is to provide a noise reducing device and a wind turbine blade that increases the flexibility of attachment of brushes.

Yet another object of the invention is to provide a noise reducing device and a wind turbine blade that allows for retrofitting of existing noise reducing devices.

Another further object of the invention is to provide a noise reducing device that allows for an easy and simple installation on the wind turbine blade and/or for an easy and simple attachment of brushes.

DETAILED DESCRIPTION OF THE INVENTION

An object of the invention is achieved by a noise reducing device for a wind turbine blade, having a first end, a second end, a first side surface, and a second side surface, wherein the noise reducing device comprises a base part configured for attachment to a side surface or a trailing edge surface of the wind turbine blade, at least one array of first noise reducing elements extending from a proximal end to the second end, and at least one array of second noise reducing elements, the second noise reducing elements have a free end and extend at least partly into a gap formed between adjacent first noise reducing elements in a non-loaded condition, wherein the base part extends from the first end to said proximal end, wherein the at least one array of second noise reducing elements is attached to or integrated into the base part, wherein the at least one array of second noise reducing elements extends parallel to the at least one array of first noise reducing elements along the proximal end, the second noise reducing elements project from a third surface of the base part towards said second end in a non-loaded condition and at least partly extend into a gap formed between adjacent first noise reducing elements.

This provides an improved noise reduction configuration providing an improved noise reduction and an improved aerodynamic performance compared to conventional noise reducing devices. This configuration allows for a greater flexibility during attachment of the second noise reducing elements, particularly compared to the noise reducing device of US 2011/0223030 A1. This configuration also allows for an easy and simple installation on a wind turbine blade as no additional control system or moveable mechanism is needed.

The present configuration further enables existing noise reducing devices to be retrofitted with second noise reducing elements for improving the overall noise and aerodynamic properties. This also enables the wind turbine blade to be fitted with a semi-brushed or fully brushed array of noise reducing devices. This increases the adaptability of the array of reducing noise devices.

According to one embodiment, the first noise reducing elements are serrations, wherein said serrations each has a length measured from the proximal end to the second end, a width measured along the proximal end, and a serration thickness measured between said first and second side surfaces.

The first noise reducing elements may in example, but not limited to, be shaped as serrations. The serrations project from a proximal end located at the base part towards a second or distal end. The profile of the serrations has a first side surface defining a pressure side, a second side surface defining a suction side and a peripheral edge located between said side surfaces. Said profile further defines a centreline extending between the proximal and distal ends.

The airflow passing over the wind turbine blade in a chordwise direction is split into plurality of local airflows by the first noise reducing elements, e.g. the serrations, when installed. The local airflows are then lead through gaps formed between adjacent serrations. Said gaps are each defined by opposite facing peripheral edges of the adjacent serrations.

The dimensions, shape, and/or density of the first noise reducing elements, e.g. serrations, may be selected dependent on a particular application, the aerodynamic profile of the wind turbine blade and/or a desired longitudinal position on the wind turbine blade. The dimensions, shape, and/or density of the first noise reducing elements may further be selected dependent on the dimensions, shape and/or density of the second noise reducing elements. This allows the array of serrations to reduce the energy of the generated vortices and also the generated trailing edge noise.

In example, one or both side surfaces of the serrations may have a straight or curved profile extending in a longitudinal direction. The longitudinal direction of the noise reducing device corresponds to the longitudinal direction of the wind turbine blade when installed. The serrations may thus be designed to have a structurally strong profile and/or to have a profile with good aerodynamic and acoustic properties.

In example, one or both side surfaces of the serrations may have a straight or curved profile extending in a transverse direction. The transverse direction of the noise reducing device corresponds to the chordwise direction of the wind turbine blade when installed. In an alternative example, the serrations may be bent, i.e. be placed in an inclined angle, relative to the base part or a portion thereof. This allows the profile of the serrations to be more or less aligned with the direction of the turbulent airflow.

In example, the peripheral edge surface(s) of the serrations may have a straight or curved profile extending the proximal and distal ends. In a particular example, the profile of the serrations may form two substantially straight peripheral edge surfaces located on opposite sides of the centreline. Opposite facing edge surfaces of two adjacent serrations may intersect at the proximal end, or intersect at a point located towards the first end of the noise reducing device. This allows for adaption of the density of the serrations and/or of the total gap area between the opposite facing edge surfaces.

The base part and/or the first noise reducing elements may be made of a flexible material, such as thermoplastics, composite materials, polymer, rubber, FUR or other suitable materials or composites. This allows the serrations to flex or bend when subjected to wind loads. Alternatively, the base part and/or noise reducing elements may be made of a rigid material, such as metals (e.g. steel) or glass or carbon fibre reinforced materials or composites. This reduces the fluttering of the serrations during operations.

According to one embodiment, the second noise reducing elements are bristles, wherein said bristles each has a length measured from the third surface to said free end.

The second noise reducing elements may in example, but not limited to, be shaped as bristles. The bristles project from a third surface which is located between the proximal end and the first end and faces towards the second or distal end. The array of bristles forms a permeable structure allowing air to pass between the individual bristles.

The dimensions, shape and/or density of the second noise reducing elements, e.g. bristles, may be selected dependent on a particular application, the aerodynamic profile of the wind turbine blade and/or a desired longitudinal position on the wind turbine blade. The dimensions, shape, and/or density of the second noise reducing elements may further be selected dependent on the dimensions, shape and/or density of the first noise reducing elements. This reduces the differential pressure between the pressure and suction sides and dampens the local airflow passing through the gaps between adjacent first noise reducing elements. This also lowers the scattering efficiency at trailing edge of wind turbine blade which further reduces the generated trailing edge noise.

In example, the bristles may be configured to flex when subjected wind loads and return to its initial shape when the wind loads is removed. The length, cross-sectional profile, longitudinal profile, elastic properties and/or material of the bristles may be selected dependent on a particular application, the aerodynamic profile of the wind turbine blade and/or a desired longitudinal position on the wind turbine blade. This allows the bristles to adapt to the local airflow and thereby have a minimal effect of the aerodynamic performance of the noise reducing device.

The second noise reducing elements may be made of a flexible material, such as composite materials, thermoplastics, e.g. polymer, nylon, silicone, rubber, PUR or other suitable materials or composites. Alternatively, the second noise reducing elements may be made of metals, e.g. steel, or glass or carbon fibre-reinforced materials and have a flexible structure.

According to a special embodiment, the bristles have a constant length or varying length along the longitudinal length of the noise reducing device, e.g. the length varies as function of the length of the serrations, and/or the serrations have a constant length or varying length along the longitudinal length of the noise reducing device.

The noise reducing device may be arranged on one side surface, e.g. the pressure or suction side, of the wind turbine blade. The proximal end of the first noise reducing elements, e.g. serrations, may in one example be aligned with a trailing edge or a trailing edge surface of the wind turbine blade when installed. The length of the projecting portion extending freely beyond the trailing edge may thus equal to the length of the serrations. This allows a maximum modifying effect on the turbulent airflow passing over the trailing edge area.

In one alternative example, the proximal end may be retracted relative to the trailing edge or trailing edge surface. The length of the freely projecting portion may thus be smaller than the length of the serrations. This reduces the modifying effect on the turbulent airflow passing over the trailing edge area.

In another alternative example, the proximal end may be extended relative to the trailing edge or trailing edge surface. The length of the freely projecting portion may thus be greater than the length of the serrations. This allows for a maximum modifying effect on the turbulent airflow and in part modifies unwanted flow structures, like vortices and shedding, near the trailing edge. Said total surface area may be determined by the first noise reducing elements and in part the base part.

In the abovementioned examples, the serrations may project equally towards the second or distal end so that the first noise reducing device has a constant width in the transverse direction. The noise reducing device may thus have substantially the same effect along the trailing edge of the wind turbine blade.

In one example, the bristles may project equally towards the second or distal end so that the second noise reducing device has a constant width in the transverse direction. The free end of the brushes, i.e. array of bristles, may be aligned with the second or distal end of the serrations. The freely projecting portion of the bristles may thus cover the entire gap between adjacent serrations and may be influenced by the local airflow entering the gaps. This provides a maximum dampening effect on the local airflow passing through these gaps.

In one alternative example, the free end of bristles may be retracted relative to second or distal end, thereby partly covering said gaps. This provides a reduced dampening effect on the local airflow passing through the gaps.

In another alternative example, the free end of bristles may be extended relative to the second or distal end, thereby covering the entire free space located adjacent to the entire peripheral edge(s) of serrations, including the abovementioned gaps. This provides a dampening effect on the local airflows passing through the gaps as well on any remaining airflows passing over the distal ends of the serrations. This enables the bristles to be provided with a standardised length which before or after installation can be cut to the desired length and/or end profile.

The serrations and/or bristles may alternatively have a varying length which varies in the transverse direction. This allows for adaption of the profile of the noise reducing device according to the airflow characteristics at particular areas on the wind turbine blade. This further allows for customisation of the length of bristles according to the length of the serrations, e.g. the end profile of the bristles may follow the end profile of the serrations with a predetermined offset, or the bristles and serrations may have different end profiles.

The array of second noise reducing elements, e.g. bristles, may be configured as a single continuous array, thus extending substantially along the entire length of the noise reducing device. Said array may alternatively be defined by a plurality of sub-arrays each with a cluster of second noise reducing elements, e.g. bristles. The individual sub-arrays may be arranged in a continuous order or spaced apart. In example, each sub-array may be aligned with the centreline of the corresponding serration.

According to one embodiment, the base part comprises a thickened portion arranged between the first end and the proximal end, wherein the thickened portion has a maximum base thickness measured between said first and second side surfaces, wherein the maximum base thickness is equal to or greater than the combined thickness of the first and second noise reducing elements.

The base part is configured to provide support for the first and second noise reducing elements. The base part may in one example have a thickened portion located between the first and proximal ends. The thickened portion may extend over the entire width from the proximal end to the first end. Alternatively, the thickened portion may start at the proximal end and end at a distance from the first end. In a further alternative, the thickened portion may be placed a distance from both the first and proximal ends. This configuration is suitable for attaching the noise reducing device, e.g. the base part, to a wind turbine blade having a truncated trailing edge surface.

The thickened portion may have a maximum base thickness which is equal to or greater than the combined thickness of the first and second noise reducing elements. The thickened portion may have a substantially rectangular, trapezoid, triangular or semicircular cross-sectional profile seen in the transverse direction. This adds structural strength to the noise reducing device. This also allows the bristles to be added in a mass-production step, in example, by punching and locking the bristles into the thickened portion using a stapling type apparatus.

The thickened portion may have a third surface suitable for attachment of the second noise reducing elements. This third surface may be arranged in an inclined angle relative to the first or second side surface and/or the centreline of the first noise reducing elements. Alternatively, the third surface may arranged perpendicularly to the first or second side surface and/or the centreline of the first noise reducing elements. Dependent on the cross-sectional profile, the third surface may face directly or partly towards to the second or distal end.

The base part may have an installation surface suitable for contacting a matching side surface or edge surface of the wind turbine blade. Said installation surface may be arranged on the thickened portion or on a thinned portion of the base part located adjacent to the thickened portion.

Alternatively, the installation surface may extend along the thinned portion and a part of the thickened portion, thereby allows the base part to contact both the side surface and the edge surface of the wind turbine blade.

The noise reducing device is configured to be attached, i.e. installed, on the wind turbine blade by means of an adhesive, fasteners like screws or bolts, or other suitable attachment techniques. The base part may optionally comprise a plurality of mounting holes extending between the first and second side surfaces for receiving and holding the fasteners. This allows for a strong attachment between the noise reducing device and the wind turbine blade.

One or both side surfaces of the noise reducing device, e.g. the base part and/or first noise reducing elements, may have a planar or curved profile as mentioned earlier. In example, said one side surface may have a convex profile relative to the centreline of the noise reducing device. This allows the profile of the noise reducing device to be adapted to the profile of the wind turbine blade.

In a particular example, one side surface has a convex profile as mentioned above while the other side surface has a planar profile. Preferably, said one surface is the side surface facing the wind turbine blade when installed. This allows for a more optimal airflow over the outer side surface and a better contact with the profile of the wind turbine blade.

The edges of said one surface may be rounded or curved to enable a more optimal airflow at the transition area between the wind turbine blade and the noise reducing device. This reduces the wear and tearing forces at the peripheral edge of the base part and/or first noise reducing elements.

According to one embodiment, the base part has a maximum base thickness measured between said first and second side surfaces of the base part, wherein the maximum base thickness substantially corresponds to the thickness of the first noise reducing elements.

The base part may in another example have substantially the same cross-sectional thickness as the first noise reducing elements. The first and/or second side surface of the base part and the first noise reducing elements may be aligned to form a substantially continuous surface profile. This saves material and weight of the base part. This configuration is suitable for attaching the noise reducing device, e.g. the base part, to a wind turbine blade having a sharp trailing edge.

The third surface and the installation surface may in this example be arranged substantially parallel to the first or second side surface and/or the centreline of the first noise reducing elements. This increases the flexibility of base part and thus enables it to better adapt to the contours of the wind turbine blade.

In both alternative embodiments of the base part, the base part acts as a common or single base part for both the first and second noise reducing elements. This eliminates the need for separate base parts as required in WO 2013/045601 A1. Secondly, the bristles are supported by the base part unlike the serration and brush arrangement of US 2011/0223030 A1. This allows for a stronger and more flexible attachment of the bristles.

According to one embodiment, said at least one array of second noise reducing elements is connected to a substrate, wherein said substrate is configured to be attached to the third surface of the base part, or said at least one array of second noise reducing elements is integrated into an adhesive layer for attachment to said first noise reducing elements and/or said side surface or trailing edge surface of the wind turbine blade.

In one example, the second noise reducing elements may be integrated or embedded into the base part. The second noise reducing elements may thus project from the third surface. This allows the noise reducing device to be manufactured as a single device using injection moulding, thermoforming or a similar manufacturing process.

In another example, the second noise reducing elements may be integrated into or attached to a supporting substrate. The substrate may have a contact surface configured to contact the third surface. Said contact surface may follow the contours of the third surface. The substrate may be attached to the base part by means of an adhesive, fasteners like bolts or screws, a mechanical coupling or other suitable attachment technique. This allows for a separate manufacture of the second noise reducing elements, optionally, using a different manufacturing process. The second noise reducing elements may thus be anchored into position using said substrate, in example, by punching and locking the bristles into the thickened portion using a stapling type apparatus or another mass-production process.

The substrate may be shaped as a flexible element, e.g. a fabric layer, a thin film or another suitable flexible structure, or made of a flexible material, e.g. thermoplastics, polypropylene, polymer, polyester, rubber, PUR or another suitable flexible material. The substrate may alternatively be made of glass or carbon fibre-reinforced materials or composites.

In yet another example, the second noise reducing elements may be integrated into an adhesive layer having at least one contact surface. This allows the second noise reducing elements to be adhered to the third surface of the base part. The adhesive layer may further extend along the installation surface of the base part and thus also be used to attach the noise reducing device to the wind turbine blade.

One or more removable cover layers may be used to protect the contact surfaces of said adhesive layer before attachment to the base part and/or before attachment to wind turbine blade. The second noise reducing elements, e.g. bristles, may simply be arranged on one or both contact surfaces of the adhesive layer, preferably before applying said cover layers. The adhesive properties of the adhesive layer may thus be used to anchor the second noise reducing elements into position.

If sub-arrays of second noise reducing elements are used, then individual substrates or adhesive layers may be used for each sub-array.

The abovementioned adhesive may be a fluid adhesive, such as methyl methacrylate (MMA) adhesives, or an adhesive layer. The abovementioned adhesive layer may be a double adhesive tape or film.

In any of the abovementioned examples, the free end of the second noise reducing elements faces directly or partly towards the second or distal end in a non-loaded condition. In example, the second noise reducing elements may project substantially parallel to the first noise reducing elements.

According to one embodiment, the noise reducing device further comprises a first adhesive layer configured to be attached to said side surface or trailing edge surface of the wind turbine blade and a second adhesive layer configured to be attached to the at least one array of second noise reducing elements.

The noise reducing device may in one example comprise a first adhesive layer and a second adhesive layer. The first adhesive layer may be used for attaching the second noise reducing elements to the base part. The second adhesive layer may be used for attaching the noise reducing device to the wind turbine blade.

The first and/or second adhesive layer may partly or fully cover the third surface and/or the installation surface of the base part. This allows the second noise reducing elements to be attached before or after the noise reducing device is attached to the wind turbine blade.

The first and second adhesive layers may be aligned in the transverse direction. In example, the first and second adhesive layers of each sub-array may be aligned according to a corresponding centreline of the serrations.

Preferably, the first and second adhesive layers may be placed on top of each other. The second noise reducing elements, e.g. bristles, may be arranged between the first and second adhesive layers or may be integrated into the first or second adhesive layer.

In a particular configuration, the first and/or second adhesive layer may form one or more encircled spaces on the third surface and/or on the installation surface. This allows a fluid adhesive to be applied which partly or fully fills up said spaces. The base part may comprise a plurality of through holes extending between the first or second side surface and into said encircled spaces, thereby allowing the fluid adhesive to be applied via said through holes and/or excess fluid adhesive to be pushed out of said through holes. This allows for an improved attachment between the noise reducing device and the wind turbine blade.

According to one embodiment, the free end forms a substantially straight end line extending in plane along the longitudinal length of the noise reducing device, or the free end forms an end line which varies out-of-plane relative to a second end line formed by said first noise reducing elements along the longitudinal length of the noise reducing device, e.g. said end line of the second noise reducing elements comprises at least one curved line portion located between two adjacent first noise reducing elements.

The first and second noise reducing elements each form individual end lines which extend in the longitudinal direction. Each end line defines an end profile of the first and second noise reducing elements respectively.

The first noise reducing elements, e.g. serrations, forms a straight end line located in the plane defined by said first noise reducing elements and thus parallel to the trailing edge of the wind turbine blade when installed. This end line may alternatively vary in-plane relative to the proximal end, or vary out-of-plane towards the suction and/or pressure side. This allows the modifying effect on the turbulent airflow to be optimised by variating the combined profile of the individual first noise reducing elements.

In one example, the second noise reducing elements, e.g. bristles, forms a straight end line located in the plane defined by said second noise reducing elements and thus parallel to the trailing edge of the wind turbine blade when installed. This end line may alternatively vary in-plane relative to the proximal end or the third surface, or vary out-of-plane towards the suction and/or pressure side. This allows for the dampening effect to be optimised by variating combined profile of the second noise reducing elements.

In an alternative example, the end line of the second noise reducing elements may comprise a number of end line portions arranged relative to the individual first noise reducing elements and the gaps therein between. Said end line portions may have a wave, square, triangular or sawtooth shaped profile. Alternatively, only the line portions located between adjacent first noise reducing elements may projects out-of-plane towards the end line of the first noise reducing elements. These projected end line portions may cross the end line of first noise reducing elements so that their peaks or crests are located on the opposite side of that end line. This enables the local airflow passing through these gaps to push the projected portions of the second noise reducing elements back into the plane, thereby creating a greater effect on the passing local airflows.

An object of the invention is also achieved by a wind turbine blade, the wind turbine blade extends in a longitudinal direction from a blade root to a tip end and in a chordwise direction from a leading edge to a trailing edge, the wind turbine blade comprises an aerodynamic profile having a first side surface and a second side surface, wherein at least one first noise reducing device as defined above is installed on the first or second side surface relative to the trailing edge or at the trailing edge.

This provides a wind turbine blade with an array of abovementioned noise reducing devices having an improved noise reduction and aerodynamic performance. Noise reducing devices already installed on the wind turbine may suitably be retrofitted with brushes as described below. Noise reducing devices with integrated second noise reducing elements may also be installed on the wind turbine blade as described above.

According to one embodiment, said trailing edge is a substantially sharp trailing edge or a blunt trailing edge having a trailing edge surface, wherein the proximal end of said at least one first noise reducing device is arranged relative to said sharp trailing edge or said trailing edge surface.

The noise reducing device described above may suitably be used on wind turbine blades with any type of trailing edges, including sharp or blunt trailing edges. The profile of the base part is adapted to enable attachment to a side surface of the wind turbine blade and/or to an edge surface of the truncated trailing edge. This allows for a simple and easy attachment of the noise reducing device.

As mentioned earlier, the profiles of the first and/or second noise reducing elements may be adapted to a particular application, a particular aerodynamic profile of the wind turbine blade, and/or a desired position along the longitudinal length of the wind turbine blade. This allows for an optimal effect on the wind turbine blade.

According to one embodiment, the wind turbine blade further comprises at least one second noise reducing device installed on the first or second side surface relative to the trailing edge or at the trailing edge, the at least one second noise reducing device is positioned relative to the at least one first noise reducing device, wherein the configuration of said at least one second noise reducing device differs from the configuration of said at least one first noise reducing device.

The wind turbine blade may be fitted any combination of noise reducing devices having different configurations of first and/or second noise reducing elements. In one example, at least one first noise reducing device may comprise both first and second noise reducing elements while at least one second noise reducing device may comprise only first or second noise reducing elements. In another example, at least one first noise reducing device may comprise a first configuration of first and second noise reducing elements while at least one second noise reducing device may comprise a second configuration of first and second noise reducing elements. In yet another example, the first and second noise reducing element may comprise the same configuration of first noise reducing elements, but different configurations of second noise reducing elements. This further reduces trailing edge noise and increases the aerodynamic performance along the trailing edge.

An object of the invention is further achieved by a method of retrofitting a noise reducing device on a wind turbine blade, comprising:

provide a wind turbine blade extending in a longitudinal direction from a blade root to a tip end and in a chordwise direction from a leading edge to a trailing edge, the wind turbine blade comprises an aerodynamic profile having a first side surface and a second side surface, wherein at least one noise reducing device is arranged on the first or second side surface or on a trailing edge surface, the at least one noise reducing device has a first end, a second end, a first side surface, and a second side surface, the noise reducing device further comprises a base part and at least one array of first noise reducing elements extending from a proximal end to the second end, the base part extends from the first end to the proximal end, wherein the method further comprises the steps of:

positioning at least one array of second noise reducing elements on the base part, arranging said at least one array of second noise reducing elements parallel to the at least one array of first noise reducing elements, attaching said at least one array of second noise reducing elements to the base part so that a free end of the second noise reducing elements substantially faces towards said second end in a non-loaded condition.

This allows existing noise reducing devices to be modified to have an improved noise reduction and aerodynamic performance without having to replace the noise reducing devices. The second noise reducing elements are suitably attached after installation of the first noise reducing elements, which in turn reduces service time and costs. The third surface of the base part is optionally prepared, e.g. cleaned, before attachment of the second noise reducing elements.

This method can suitably be used for modification of some noise reducing devices while other noise reducing devices remains unmodified. This method is also suited for attachment of a first configuration of second noise reducing elements to one noise reducing device and attachment of a second configuration of second noise reducing elements to another noise reducing device. The different configurations of second noise reducing elements are simply attached to the base part of the noise reducing device so that their respective free ends project along one side surface of the first noise reducing elements and face directly or partly towards to the distal end as described above.

This allows different noise reducing devices with different configurations to be combined on the wind turbine blade, thereby further improving the aerodynamic performance and reducing the trailing edge noise.

An object of the invention is additionally achieved by a method of manufacturing a noise reducing device for a wind turbine blade, comprising:

manufacturing a noise reducing device having a first end, a second end, a first side surface, and a second side surface, wherein the noise reducing device comprises a base part configured for attachment to a side surface or a trailing edge surface of the wind turbine blade, and at least one array of first noise reducing elements extending from a proximal end to the second end, wherein the base part extends from the first end to said proximal end, wherein the method further comprises the steps of:

manufacturing at least one array of second noise reducing elements, the second noise reducing elements have a free end, positioning said at least one array of second noise reducing elements on the base part, arranging said at least one array of second noise reducing elements parallel to the at least one array of first noise reducing elements, attaching the at least one array of second noise reducing elements to the base part so that the free end substantially faces towards said second end in a non-loaded condition.

This provides a two-step manufacturing process for providing a noise reducing device as described above. In one step, the first noise reducing elements and the base part is formed using any suitable manufacturing process, e.g. injection moulding or thermoforming. In a parallel or subsequent step, the second noise reducing elements are manufactured using a separate manufacturing process, e.g. attached to a substrate or integrated into an adhesive layer. This allows the use of different manufacturing processes.

After completion of the separate manufacturing steps, the second noise reducing elements is optionally packed and transported to the site of the first noise reducing elements. Said site may be another production site, an assembly site or the installation site of the wind turbine.

The second noise reducing elements are then positioned on the third surface on the base part so that the free end project along the side surface of the first noise reducing elements and face directly or partly towards to the distal end as described above. A guidance or installation tool may be used to position the second noise reducing elements correctly on the third surface. The second noise reducing elements may be arranged in the guidance or installation tool prior to placement on the third surface.

The second noise reducing elements are finally attached to the base part as described above. Optionally, the third surface is prepared, e.g. cleaned, before attachment of the second noise reducing elements. No need for separate base parts or a very precise alignment of the bristles on the peripheral edge of the serrations.

After the attachment is completed, the guidance or installation tool may be removed. The guidance or installation tool can then be reused to attach another array of second noise reducing elements on another noise reducing device.

DESCRIPTION OF DRAWINGS

The invention is explained in detail below with reference to embodiments shown in the drawings, in which.

LIST OF REFERENCES

Figure 1:
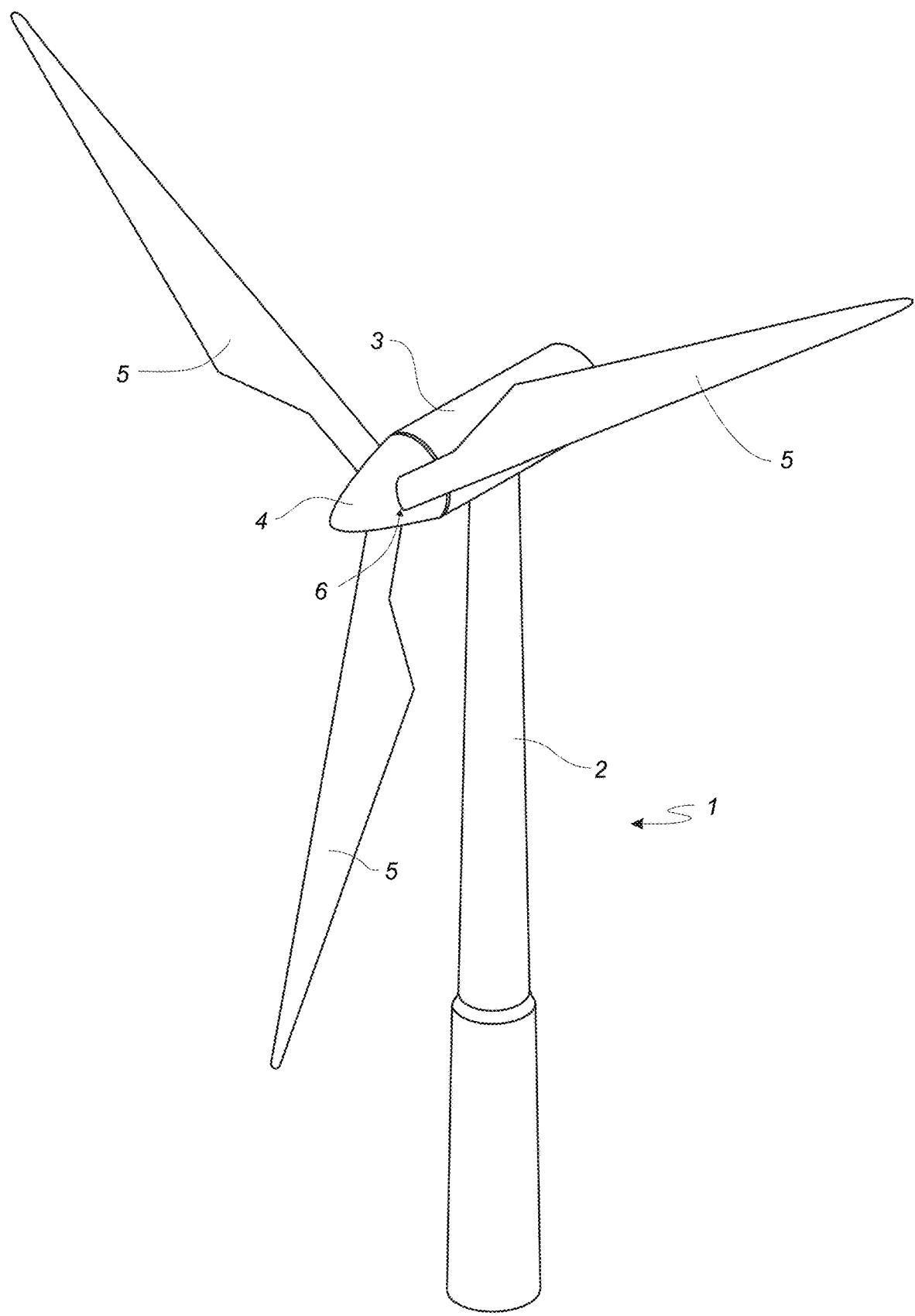
FIG. 1 shows a wind turbine.

1. Wind turbine
2. Wind turbine tower
3. Nacelle
4. Hub
5. Wind turbine blades
6. Pitch bearing
7. Blade root
8. Tip end
9. Leading edge
10. Trailing edge
11. Blade shell
12. Pressure side
13. Suction side
14. Blade root portion
15. Aerodynamic blade portion
16. Transition portion
17. Length of wind turbine blade
18. Chord length of wind turbine blade
19. Noise reducing device
20. First side surface
21. First end
22. Second end
23. Base part
24. Proximal end
25. First noise reducing elements
26. Second noise reducing elements
27. Second side surface
28. Thickened portion
29. Installation surface
30. Third surface
31. Trailing edge surface
32. Substrate
33. Guidance tool
34. Continuous array of second noise reducing elements
35. Sub-array of second noise reducing elements
36. End line
37. First adhesive layer
38. Second adhesive layer The listed reference numbers are shown in abovementioned drawings where no all reference numbers are shown on the same figure for illustrative purposes. The same part or position seen in the drawings will be numbered with the same reference number in different figures.

DETAILED DESCRIPTION OF THE DRAWINGS

FIG. 1 shows a modern wind turbine 1 comprising a wind turbine tower 2, a nacelle 3 arranged on top of the wind turbine tower 2, and a rotor defining a rotor plane. The nacelle 3 is connected to the wind turbine tower 2, e.g. via a yaw bearing unit. The rotor comprises a hub 4 and a number of wind turbine blades 5. Here three wind turbine blades are shown, but the rotor may comprise more or fewer wind turbine blades 5. The hub 4 is connected to a drive train, e.g. a generator, located in the wind turbine 1 via a rotation shaft.

The hub 4 comprises a mounting interface for each wind turbine blade 5. A pitch bearing unit 6 is optionally connected to this mounting interface and further to a blade root of the wind turbine blade 5.

Figure 2:
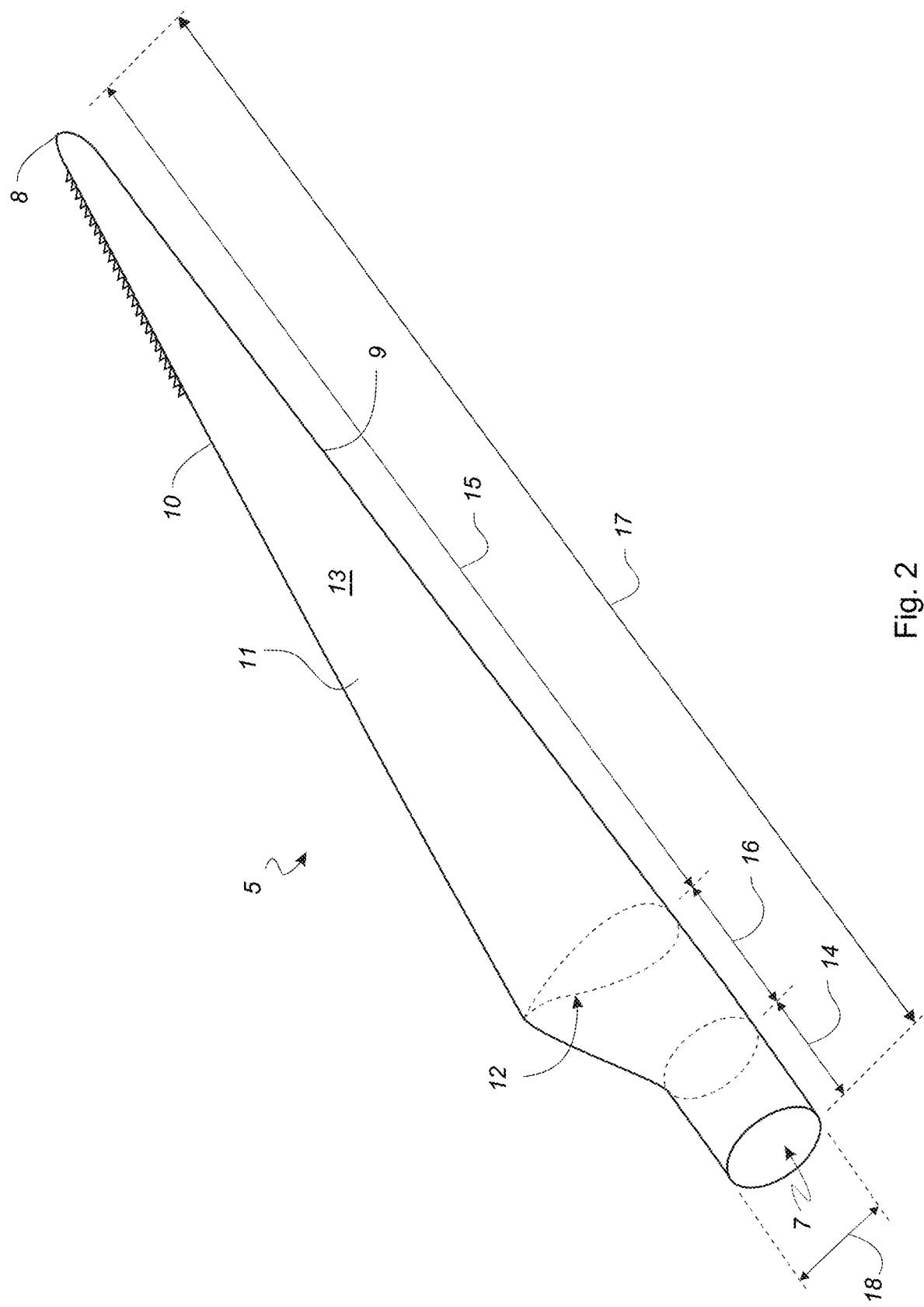
FIG. 2 shows an exemplary embodiment of the wind turbine blade.

FIG. 2 shows a schematic view of the wind turbine blade 5 which extends in a longitudinal direction from a blade root 7 to a tip end 8. The wind turbine blade 5 further extends in a chordwise direction from a leading edge 9 to a trailing edge 10. The wind turbine blade 5 comprises a blade shell 11 having two opposite facing side surfaces defining a pressure side 12 and a suction side 13 respectively. The blade shell 11 further defines a blade root portion 14, an aerodynamic blade portion 15, and a transition portion 16 between the blade root portion 14 and the aerodynamic blade portion 15.

The blade root portion 14 has a substantially circular or elliptical cross-section (indicated by dashed lines). The blade root portion 14 together with a load carrying structure, e.g. a main laminate combined with a shear web or a box beam, are configured to add structural strength to the wind turbine blade 5 and transfer the dynamic loads to the hub 4. The load carrying structure extends between the pressure side 12 and the suction side 13 and further in the longitudinal direction.

The blade aerodynamic blade portion 15 has an aerodynamically shaped cross-section (indicated by dashed lines) designed to generate lift. The cross-sectional profile of the blade shell 11 gradually transforms from the circular or elliptical profile into the aerodynamic profile in the transition area 16.

The wind turbine blade 5 has a longitudinal length 17 of at least 35 metres, preferably at least 50 metres. The wind turbine blade 5 further has a chord length 18 as function of the length 17, wherein the maximum chord length is found between the blade aerodynamic blade portion 15 and the transition area 16.

Figure 3:
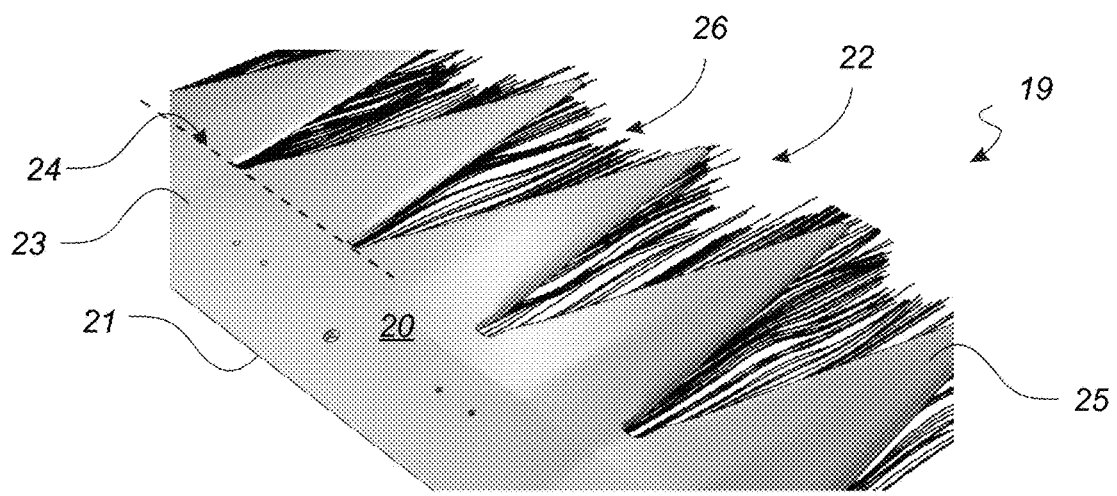
FIG. 3 shows a perspective view of a first exemplary embodiment of a noise reducing device according to the invention.

FIG. 3 shows a first exemplary embodiment of a noise reducing device 19 configured to be installed on the wind turbine blade 5. The noise reducing device 19 has a first side surface 20, a second side surface (see FIG. 4), a first end 21 and a second end 22.

The noise reducing device 19 comprises a base part 23 extending from the first end 21 to a proximal end 24 and a number of first noise reducing elements 25 extending from the proximal end 24 towards the second end 22. The noise reducing device 19 further comprises a number of second noise reducing elements 26 extending from a third surface (see FIG. 5) located on the base part 23 towards to the second end 22.

Figure 4:
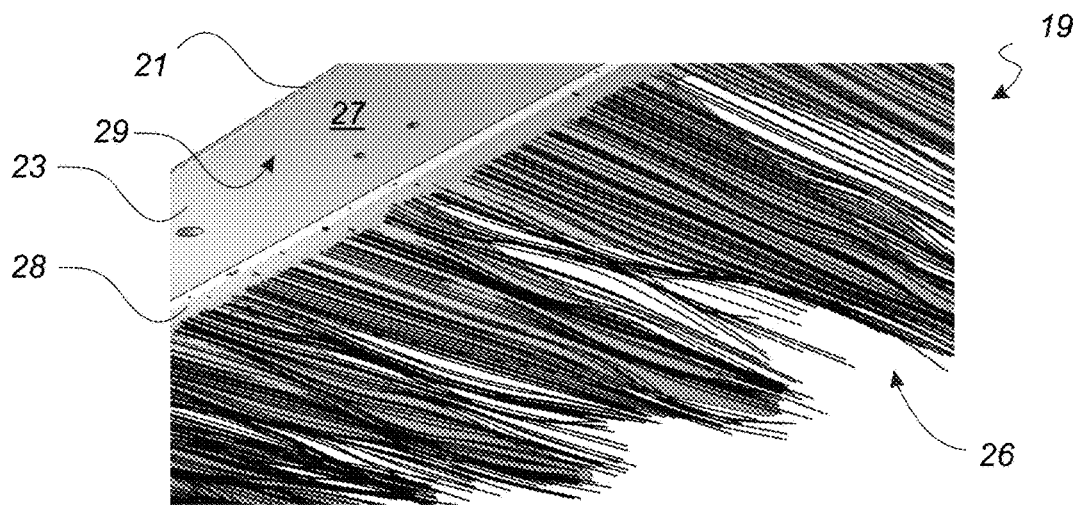
FIG. 4 shows another perspective view of the noise reducing device of FIG. 3.

FIG. 4 shows the second side surface 27 of the noise reducing device 19. The base part 23 comprises a thickened portion 28 projection from the second side surface 27. The thickened portion 28 is arranged towards the proximal end 24, wherein the third surface (see FIG. 5) is facing towards the second end 22. The base part 23 further has an installation surface 29 located on a thinned portion of the base part 23.

Here the thickened portion 28 is formed as an integrated part of the base part 23 and thus the second noise reducing elements 26 are integrated into the base part 23.

Figure 5:
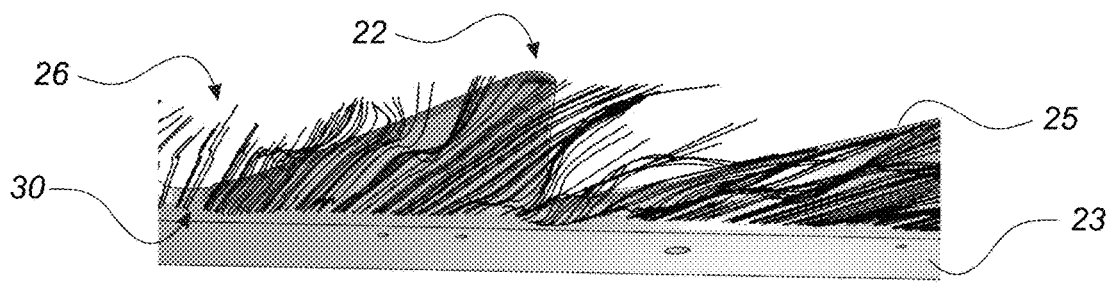
FIG. 5 shows the noise reducing device of FIG. 3 seen from the second end.

FIG. 5 shows the noise reducing device 19 seen from the second end 22 where the second noise reducing elements 26 are influenced by local airflows passing through gaps formed between adjacent first noise reducing elements 25.

As seen in FIGS. 4 and 5, the second noise reducing elements 26 extends in a transverse direction from the third surface 30 to the second end 22 along the second side surface 27 of the first noise reducing elements 25. The second noise reducing element 26 further project into the abovementioned gaps and thereby at least partly cover said gaps.

Figure 6:
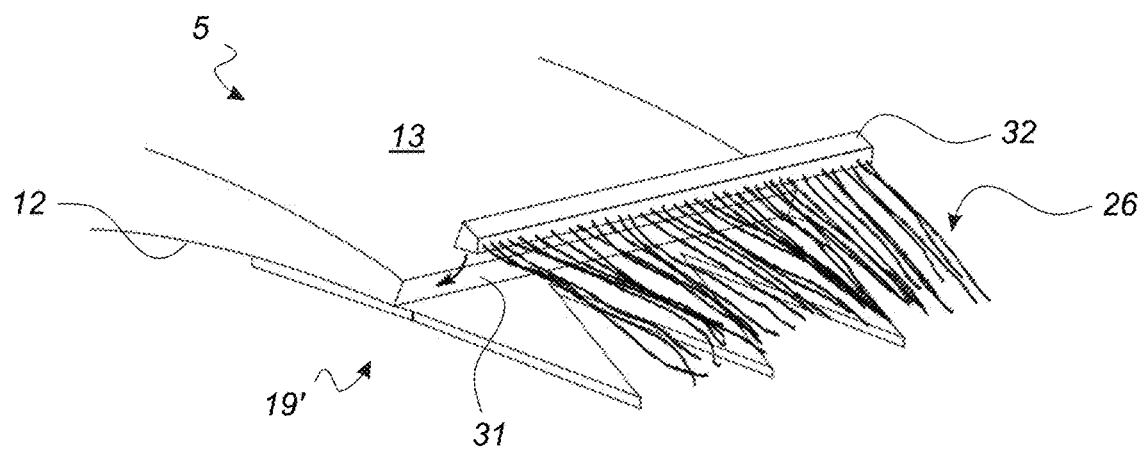
FIG. 6 shows a second exemplary configuration of the second noise reducing device installed on the wind turbine blade.

FIG. 6 shows a second exemplary configuration of the noise reducing device 19' installed on the wind turbine blade 5. Here the wind turbine blade 5 is shows with a truncated trailing edge having a trailing edge surface 31. The installation surface 29 of the noise reducing device 19' is arranged on the pressure side 12 of the wind turbine blade 5. Here the proximal end 24 is extended relative to the trailing edge surface 31.

Figure 7:
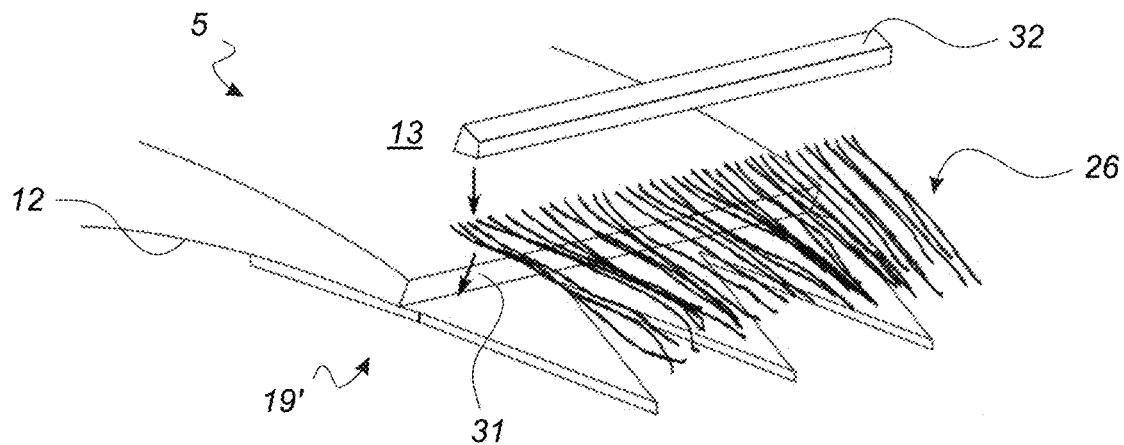
FIG. 7 shows a second exemplary configuration of the second noise reducing elements.

As illustrated in FIGS. 6 and 7, the first noise reducing elements 25 is located towards the pressure side 12 while the second noise reducing elements 26 is located towards the suction side 13.

In this configuration, the second noise reducing elements 26 is integrated, e.g. embedded, in a substrate 32 extending in a longitudinal direction. As indicated by the arrow, the substrate 32 is positioned on the base part 23 so that a contact surface of the substrate 32 contacts the third surface 30. The substrate 32 is then attached to the base part 23, e.g. by applying an adhesive to the contact surface and/or the third surface 30.

FIG. 7 shows the noise reducing device 19' with a second exemplary configuration of the second noise reducing elements 26. Here the second noise reducing elements 26 are separated from the substrate 32.

In this configuration, the second noise reducing elements 26 are firstly positioned on the third surface 30 after which the substrate 32 is positioned on top of the second noise reducing elements 26 as indicated by arrows. The substrate 32 is finally attached to the base part 23, e.g. e.g. by applying an adhesive to the contact surface, the third surface 30 and/or on top of the second noise reducing elements 26.

The second noise reducing elements 26 may be attached after installation of the base part 23 and the first noise reducing elements 25, as illustrated in FIGS. 6 and 7. This allows for retrofitting existing noise reducing device with additional noise reducing elements, e.g. brushes. The second noise reducing elements 26 may also be to the base part 23 before installation of the noise reducing device 19'.

Figure 8:
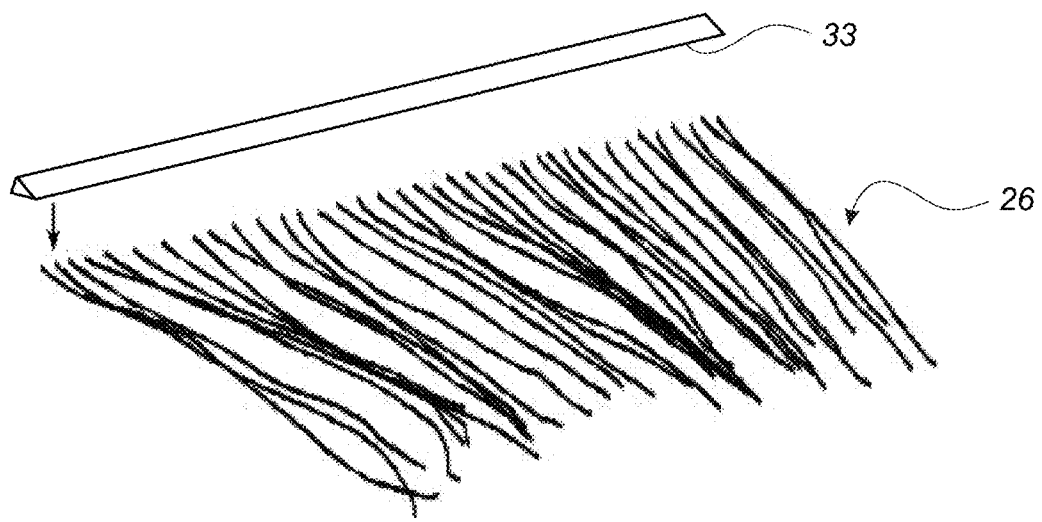
FIG. 8 shows an exemplary embodiment of a guidance tool.

FIG. 8 shows an exemplary embodiment of a guidance tool 33 configured to hold the second noise reducing elements 26 in their correct position during attachment. The guidance tool 33 comprises any suitable means, e.g. holes, clamps or adhesive, in or on which the second noise reducing elements 26 can be arranged. The second noise reducing elements 26 are preferably arranged in the guidance tool 33 before positioning the second noise reducing elements 26 on the third surface 30.

Figure 9:
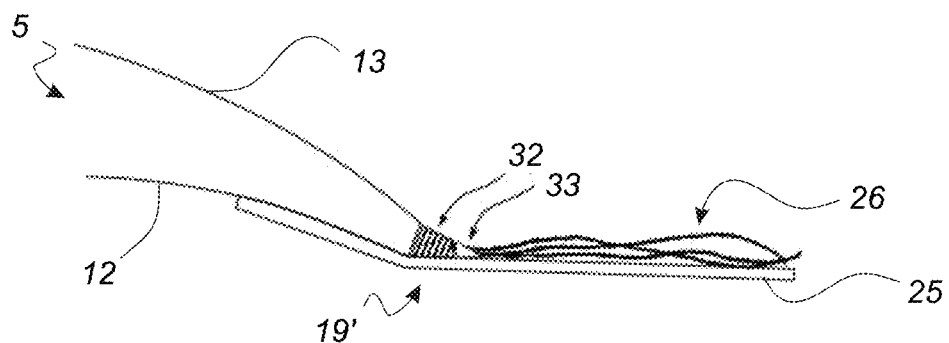
FIG. 9 shows a cross-section of the noise reducing device installed on the wind turbine blade and of the guidance tool.

FIG. 9 shows a cross-section of the noise reducing device 19' installed on the wind turbine blade 5 with the guidance tool 33. Before positioning the substrate 32 on the base part 23, the second noise reducing elements 26 are positioned on the third surface using the guidance tool 33. Then the substrate 32 is positioned and attached to the base part 23. Finally, the guidance tool 33 is disconnected from the second noise reducing elements 26 and removed.

Optionally, the substrate 32 can be further attached to the trailing edge surface 31 to increase the overall attachment area.

FIGS. 10a-f show six embodiments of the profile of the second noise reducing element 26. The second noise reducing element 26 can have a circular, a square, a polygonal, a rectangular or an elliptic cross-sectional profile as illustrated in FIGS. 10a to 10e.

Figure 10:
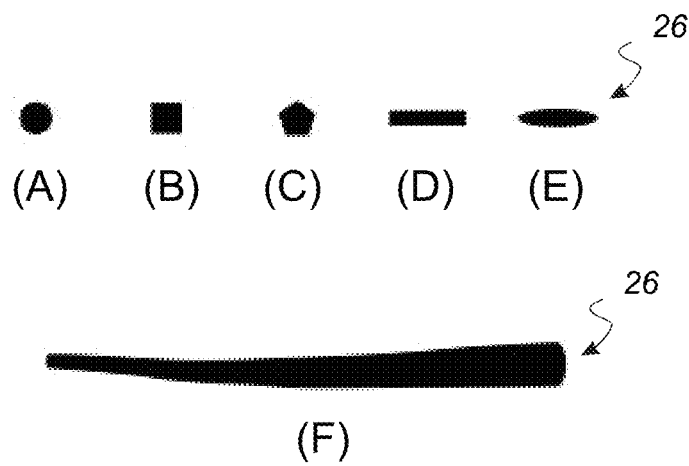
FIGS. 10a-f show a cross-sectional view of six embodiments of the second noise reducing elements.

The second noise reducing element 26 can also have a tapered profile extending from the attached end, i.e. the third surface 30 or the substrate 32, to the free end as illustrated in FIG. 10f.

Figure 11:
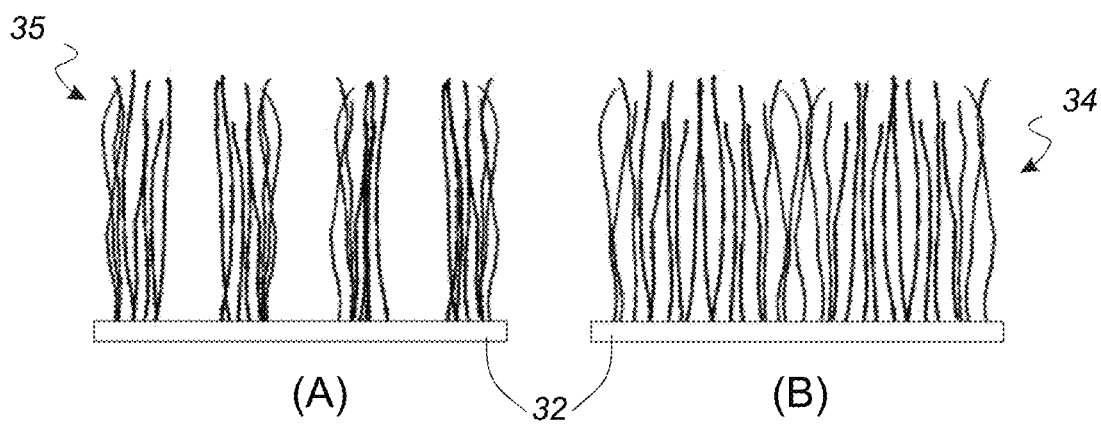
FIGS. 11a-b show two embodiments of the array of the second noise reducing elements.

FIGS. 11a-b show two embodiments of the array of second noise reducing elements 26 seen in the longitudinal direction. The array of second noise reducing elements 26 can form a continuous array 34 as illustrated in FIG. 11b. The array of second noise reducing elements 26 can also be defined by a plurality of sub-arrays 35 as illustrated in FIG. 11a, wherein each sub-array 35 comprises a cluster of second noise reducing elements 26.

Figure 12:
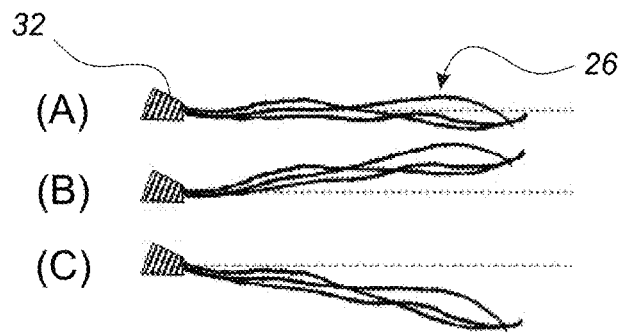
FIGS. 12a-c show a cross-sectional view of three additional embodiments of the second noise reducing elements.

FIGS. 12a-c show a cross-sectional view of three additional embodiments of the second noise reducing elements 26. The free end and the attached end of the second noise reducing elements 26 may substantially be arranged in the same plane as indicated in FIG. 12a. The free end of the second noise reducing elements 26 may also extend out-of-plane towards the suction side as indicated in FIG. 12a. The free end of the second noise reducing elements 26 may also extend out-of-plane towards the pressure side as indicated in FIG. 12b.

The array of second noise reducing elements 26 form a free end profile (see FIGS. 13 and 14) extending in the longitudinal direction.

Figure 13:
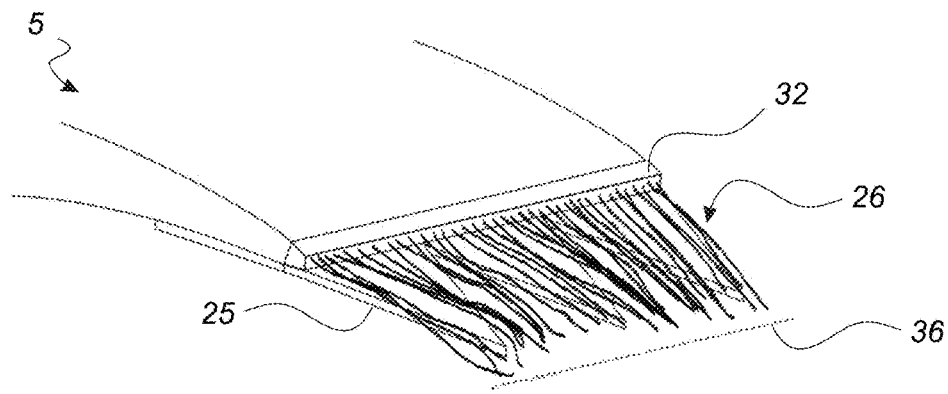
FIG. 13 shows the second noise reducing elements with a straight end profile.

FIG. 13 shows the second noise reducing elements 26 with a free end profile arranged in-plane. The free end profile defines a straight end line 36 so that the length of the second noise reducing elements 26 is constant over the longitudinal length.

Figure 14:
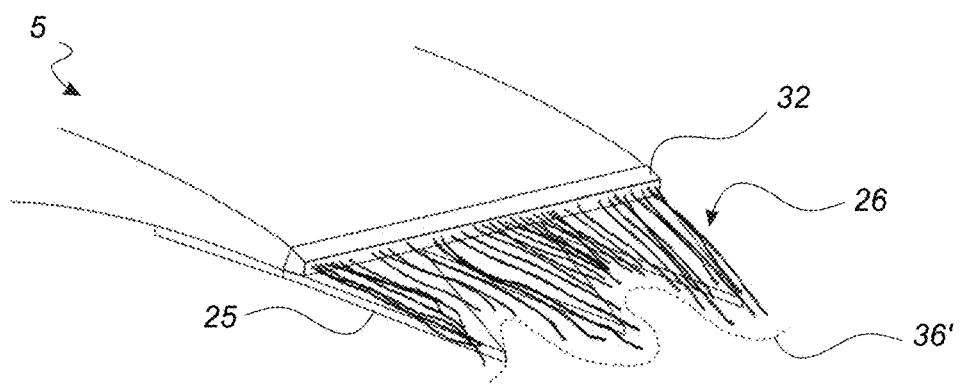
FIG. 14 shows the second noise reducing elements with a varying end profile.

FIG. 14 shows the second noise reducing elements 26, wherein the free end profile varies in-plane over the longitudinal length. The end line 36' of this free end profile varies relative to the proximal end 24 so the second noise reducing elements 26 has a varying length over the longitudinal length. Here the end line 36' has a substantially wave shaped end profile as illustrated in FIG. 14.

Figure 15:
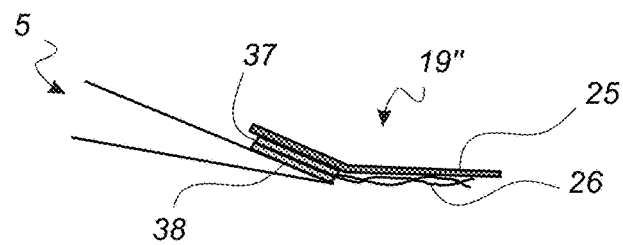
FIG. 15 shows a third exemplary configuration of the second noise reducing elements attached to base part.

FIG. 15 shows a third exemplary configuration of the second noise reducing device 19'' installed on the wind turbine blade 5. The wind turbine blade 5 is here shown with a sharp trailing edge where the noise reducing device is installed on one side surface, e.g. the pressure side 12.

The noise reducing device 19'' comprises a first adhesive layer 37 and a second adhesive layer 38. The first adhesive layer 37 is configured to attach the second noise reducing elements 26 to the base part 23. The second adhesive layer 38 is configured to attach the second noise reducing elements 26 to the wind turbine blade 5.

The second noise reducing elements 26 can be arranged between the first and second adhesive layers 37, 38 using the guidance tool 33. The second noise reducing elements 26 can also be integrated into the first or second adhesive layer 37, 38.

Figure 16:
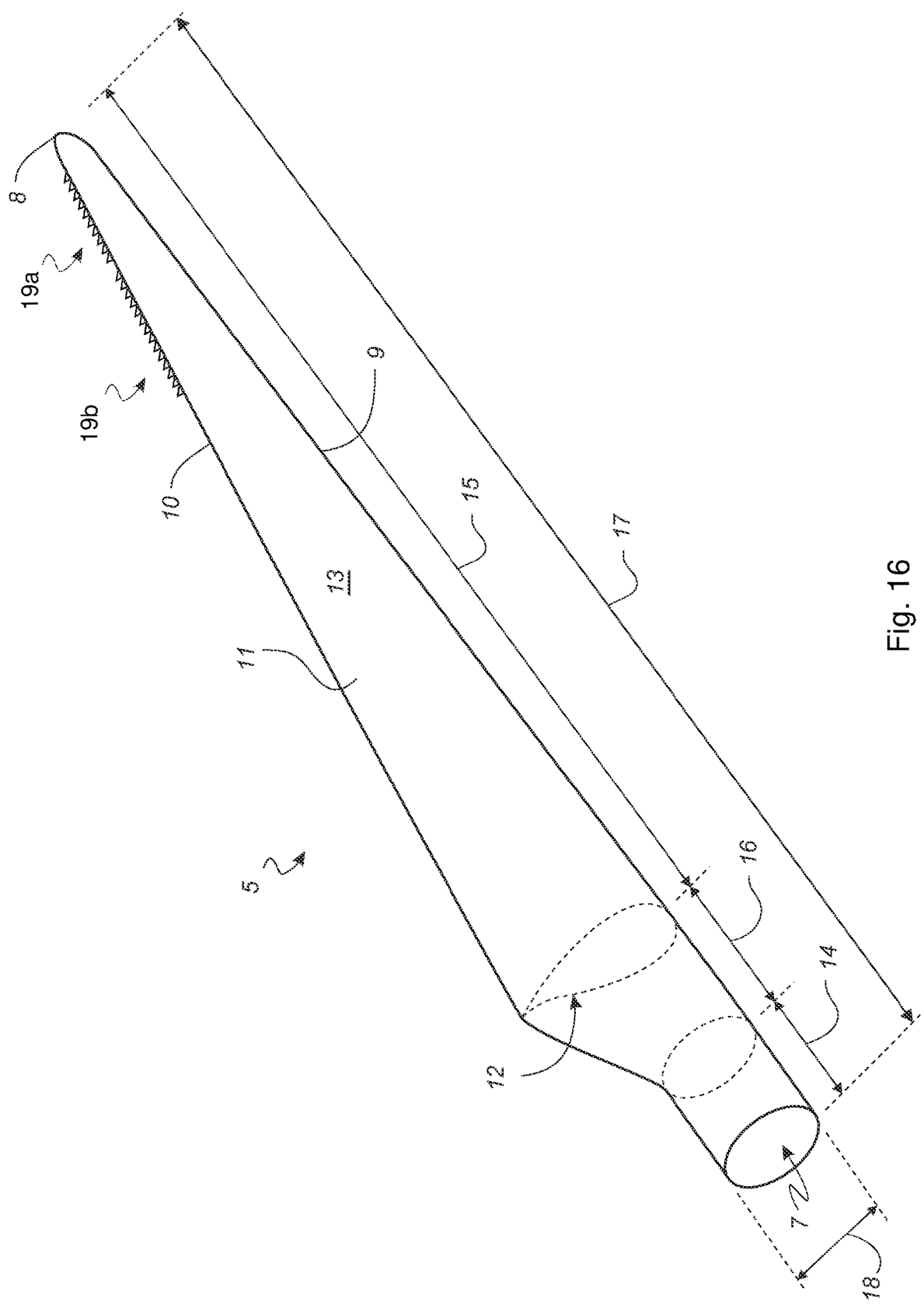
FIG. 16 shows an alternative embodiment of the wind turbine blade with an exemplary second noise reducing device.

FIG. 16 shows an alternative embodiment in which a second noise reducing device 19b is positioned relative to the first noise reducing device 19a. The configuration of the second noise reducing device 19b may differ from the configuration of the first noise reducing device 19a.

The abovementioned embodiments may be combined in any combinations without deviating from the present invention.

The invention claimed is:

1. A noise reducing device (19) for a wind turbine blade (5), having a first end (21), a second end (22), a first side surface (20), and a second side surface (27), wherein the noise reducing device (19) comprises a base part (23) configured for attachment to a side surface or a trailing edge surface (31) of the wind turbine blade (5), at least one array of first noise reducing elements (25) extending from a proximal end (24) to the second end (22), and at least one array of second noise reducing elements (26) separate from the at least one array of first noise reducing elements (25), the at least one array of second noise reducing elements (26) have a free end and extend at least partly into a gap formed between adjacent the at least one array of first noise reducing elements (25) in a non-loaded condition, wherein the base part (23) extends from the first end (21) to said proximal end (24), wherein the at least one array of second noise reducing elements (26) is attached to or integrated into the base part (23), the at least one array of second noise reducing elements (26) project from a third surface (30) of the base part (23) towards said second end (22), wherein the at least one array of first noise reducing elements (25) are serrations, wherein the at least one array of second noise reducing elements (26) are bristles, the serrations lying within, and extending within, a first plane, and the bristles substantially lying within, and substantially extending within, a second plane, wherein the first plane and the second plane are parallel and spaced apart from one another, and wherein each of the serrations extends from the proximal end (24), and wherein each of the bristles projects from an attachment line extending parallel to the proximal end (24), wherein the attachment line is positioned between the proximal end (24) and the first end (21), the attachment line being nearer the proximal end (24) than the first end (21).

2. The noise reducing device according to claim 1, wherein said serrations each has a length measured from the proximal end (24) to the second end (22), a width measured along the proximal end (24), and a serration thickness measured between said first and second side surfaces.

3. The noise reducing device according to claim 1, wherein said bristles each has a length measured from the third surface (30) to said free end.

4. The noise reducing device according to claim 2, wherein the bristles have a constant length or varying length along a longitudinal length of the noise reducing device (19), and/or the serrations have a constant length or varying length along the longitudinal length of the noise reducing device (19).

5. The noise reducing device according to claim 1, wherein the base part (23) comprises a thickened portion (28) arranged between the first end (21) and the proximal end (24), wherein the thickened portion (28) has a base thickness measured between said first and second side surfaces, wherein the base thickness is equal to or greater than the combined thickness of the first and second noise reducing elements (25, 26).

6. The noise reducing device according to claim 1, wherein the base part (23) has a base thickness measured between first and second side surfaces of the base part (23), wherein the base thickness substantially corresponds to the thickness of the first noise reducing elements (25).

7. The noise reducing device according to claim 1, wherein said at least one array of second noise reducing elements (26) is connected to a substrate (32), wherein said substrate (32) is configured to be attached to the third surface (30) of the base part (23), or said at least one array of second noise reducing elements (26) is integrated into an adhesive layer (37, 38) for attachment to said at least one array of first noise reducing elements (25) and/or said side surface or trailing edge surface (31) of the wind turbine blade (5).

8. The noise reducing device according to claim 1, wherein the noise reducing device (19) further comprises a first adhesive layer (37) configured to be attached to said side surface or the trailing edge surface (31) of the wind turbine blade (5) and a second adhesive layer (38) configured to be attached to the at least one array of second noise reducing elements (26).

9. The noise reducing device according to claim 1, wherein the free end forms a substantially straight end line (36) extending in plane along a longitudinal length of the noise reducing device (19), or the free end forms an end line (36') which varies out-of-plane relative to a second end line formed by said at least one array of first noise reducing elements (25) along the longitudinal length of the noise reducing device (19).

10. A wind turbine blade, the wind turbine blade (5) extends in a longitudinal direction from a blade root (7) to a tip end (8) and in a chordwise direction from a leading edge (9) to a trailing edge (10), the wind turbine blade (5) comprises an aerodynamic profile having a first side surface and a second side surface, wherein at least one first noise reducing device (19) according to claim 1 is installed on the first or second side surface of the wind turbine blade relative to the trailing edge (10) or at the trailing edge (10).

11. The wind turbine blade according to claim 10, wherein said trailing edge (10) is a substantially sharp trailing edge or a blunt trailing edge having a trailing edge surface (31), wherein the proximal end (24) of said at least one first noise reducing device (19) is arranged relative to said sharp trailing edge or said trailing edge surface (31).

12. The wind turbine blade according to claim 10, wherein the wind turbine blade (5) further comprises at least one second noise reducing device (19) installed on the first or second side surface of the wind turbine blade relative to the trailing edge (10) or at the trailing edge (10), the at least one second noise reducing device (19) is positioned relative to the at least one first noise reducing device (19), wherein a configuration of said at least one second noise reducing device (19) differs from a configuration of said at least one first noise reducing device (19).

13. A method of retrofitting a noise reducing device on a wind turbine blade, comprising:

providing a wind turbine blade (5) extending in a longitudinal direction from a blade root (7) to a tip end (8) and in a chordwise direction from a leading edge (9) to a trailing edge (10), the wind turbine blade (5) comprises an aerodynamic profile having a first side surface and a second side surface, wherein at least one noise reducing device (19) is arranged on the first or second side surface or on a trailing edge surface (31), the at least one noise reducing device (19) has a first end (21), a second end (22), a first side surface (20), and a second side surface (27), the noise reducing device (19) further comprises a base part (23) and at least one array of first noise reducing elements (25) extending from a proximal end (24) to the second end (22), the base part (23) extends from the first end (21) to the proximal end (24), wherein the method further comprises the steps of:

positioning at least one array of second noise reducing elements (26) on the base part (23), the at least one array of second noise reducing elements (26) being separate from the at least one array of first noise reducing elements (25), wherein the at least one array of first noise reducing elements (25) are serrations and the at least one array of second noise reducing elements (26) are bristles, the serrations and the bristles being arranged such that the serrations lie within, and extend within, a first plane, and the bristles substantially lie within, and substantially extend within, a second plane, wherein the first plane and the second plane are parallel and spaced apart from one another, the serrations and bristles being further arranged such that each of the serrations extends from the proximal end (24), and each of the bristles projects from an attachment line extending parallel to the proximal end (24), wherein the attachment line is positioned between the proximal end (24) and the first end (21), the attachment line being nearer the proximal end (24) than the first end (21); and attaching said at least one array of second noise reducing elements (26) to the base part (23) so that a free end of the at least one array of second noise reducing elements (26) substantially faces towards said second end (22) in a non-loaded condition.

14. A method of manufacturing a noise reducing device for a wind turbine blade, comprising:

manufacturing a noise reducing device (19) having a first end (21), a second end (22), a first side surface (20), and a second side surface (27), wherein the noise reducing device (19) comprises a base part (23) configured for attachment to a side surface or a trailing edge surface (31) of the wind turbine blade (5), and at least one array of first noise reducing elements (25) extending from a proximal end (24) to the second end (22), wherein the base part (23) extends from the first end (21) to said proximal end (24), wherein the method further comprises the steps of:

manufacturing at least one array of second noise reducing elements (26), the at least one array of second noise reducing elements (26) have a free end, the at least one array of second noise reducing elements (26) being separate from the at least one array of first noise reducing elements (25);

positioning said at least one array of second noise reducing elements (26) on the base part (23), wherein the at least one array of first noise reducing elements (25) are serrations and the at least one array of second noise reducing elements (26) are bristles, the serrations and the bristles being arranged such that the serrations lie within, and extend within, a first plane, and the bristles substantially lie within, and substantially extend within, a second plane, wherein the first plane and the second plane are parallel and spaced apart from one another, the serrations and bristles being further arranged such that each of the serrations extends from the proximal end (24), and each of the bristles projects from an attachment line extending parallel to the proximal end (24), wherein the attachment line is positioned between the proximal end (24) and the first end (21), the attachment line being nearer the proximal end (24) than the first end (21); and attaching the at least one array of second noise reducing elements (26) to the base part (23) so that the free end substantially faces towards said second end (22) in a non-loaded condition.

15. The noise reducing device according to claim 4, wherein the bristles have a length which varies as a function of the length of the serrations.

16. The noise reducing device according to claim 9, wherein said end line of the at least one array of second noise reducing elements (26) comprises at least one curved line portion located between two adjacent ones of the at least one array of first noise reducing elements (25).

\* \* \* \* \*